April 14, 1970  H. RUEGER  3,506,836
OPTICAL PROGRAMMER WITH OPTIC FIBER MEANS FOR INDICATING
OPERATING INTELLIGENCE FOR EQUIPMENT CONTROLLING MEANS
Filed Aug. 23, 1966  4 Sheets-Sheet 3
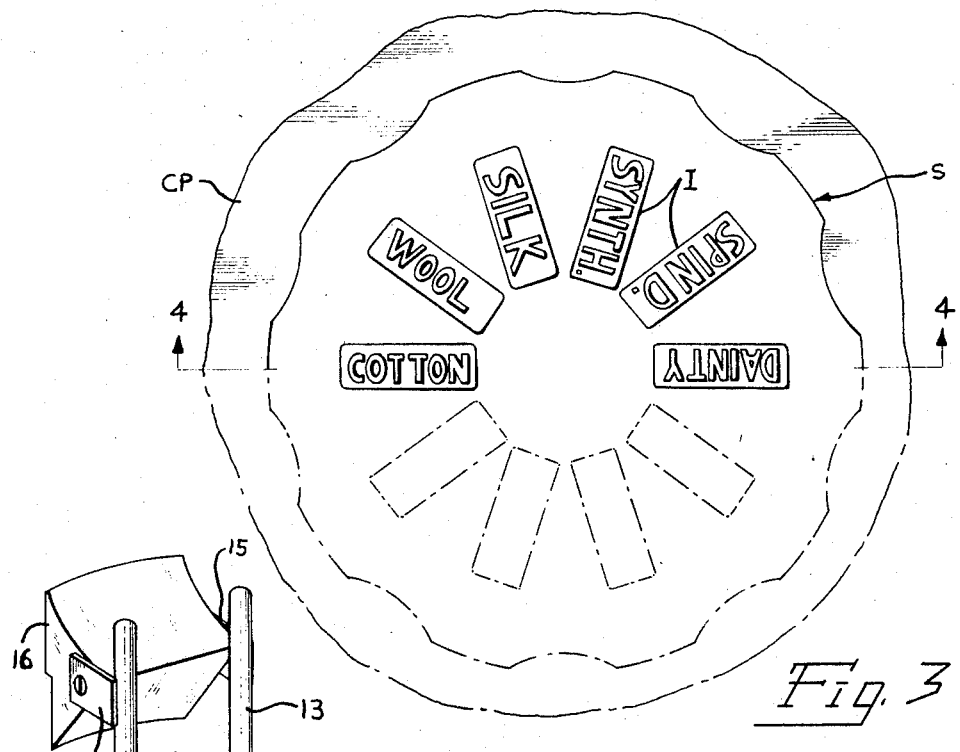
Fig. 3
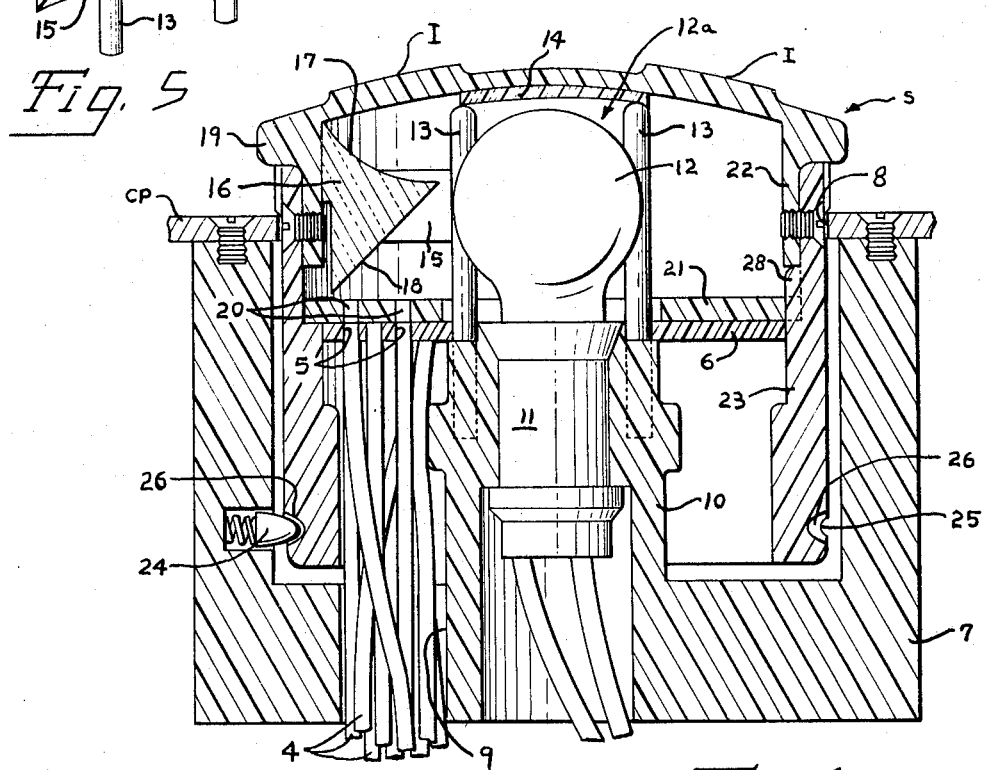
Fig. 5
Fig. 4

United States Patent Office 3,506,836
Patented Apr. 14, 1970

3,506,836
OPTICAL PROGRAMMER WITH OPTIC FIBER MEANS FOR INDICATING OPERATING INTELLIGENCE FOR EQUIPMENT CONTROLLING MEANS
Herman Rueger, Lancaster, Pa., assignor to AMP Incorporated, Harrisburg, Pa.
Filed Aug. 23, 1966, Ser. No. 574,458
Int. Cl. G01n 21/30
U.S. Cl. 250—219       10 Claims

ABSTRACT OF THE DISCLOSURE

An optical programming device uses fiber optic means in conjunction with a code-disc having coded areas, the code-disc being disposed between a light source and the ends of the fiber optic means so that movement of the code-disc to any of the coded areas transmits light via the fiber optic means in accordance with the selected coded area as intelligence to a remote location and at which location the intelligence is utilized.

---

This invention relates to a optical device and more particualrly to an optical programming device.

Selectable program means to indicate a desired arrangement so that an operator can move operating members to positions indicative of the selected program to control equipment to perform a desired operation or to automatically control eequipment to perform the desired operation are known. These selectable program means are complicated and require a large number of parts.

An object of the invention is to provide a selectable programming means that is simple in construction and requires a small number of parts.

Another object is the provision of a selectable programming means using a single light source to indicate a selected program.

A further object is to provide a selectable programming means to automatically control operation of equipment.

An additional object is the provision of a selectable programming means using fiber optic means in association with a single light source to selectively illuminate fiber optic means.

A still further object of the invention is to provide a lens means to increase the illumination of a small light source.

Still an additional object of the invention is the provisions of selectable-programming means to transmit selectable coded information to equipment-controlling means to provide operating intelligence for the equipment-controlling means.

Other objects and attainments of the present invention will become apparent to thse skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing and other objects are obtained by a preferred embodiment of an optical programming device comprising fiber optic means having one of their ends disposed in a preselected array and the other of their ends secured adjacent equipment-controlling means, a disc having areas provided with selectively-arranged openings to define coded areas, means to move said disc relative to said preselected array of fiber optic ends to place one of said coded areas in alignment with said preselected array, and light means disposed adjacent said preselected array to transmit light through said openings in the selected coded area and into the fiber optic means in alignment with these openings with the light received in these fiber optic means being transmitted thereby to the other ends of the fiber optic means to provide operating intelligence for said equipment-controlling means.

Figure 1:
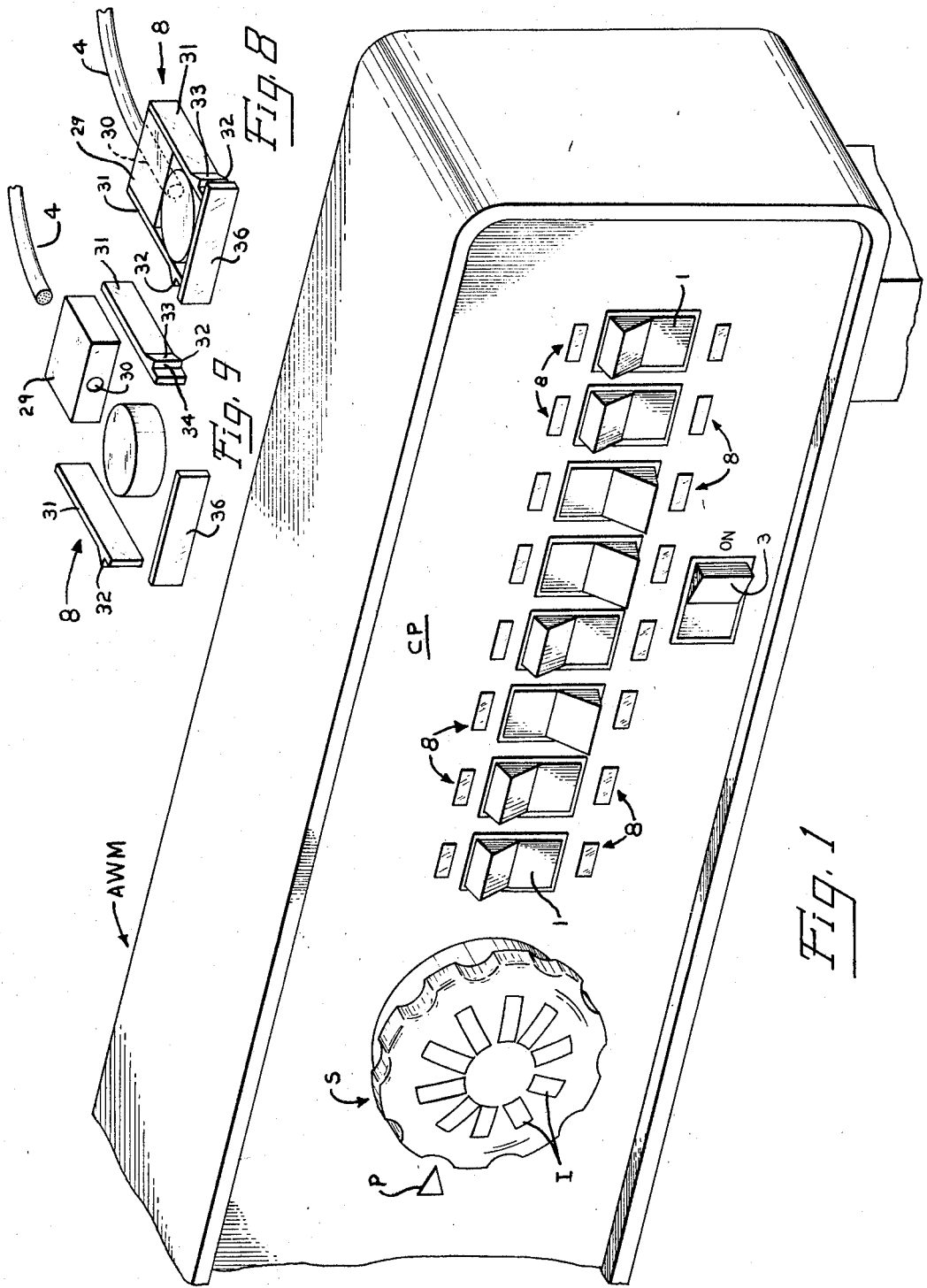
Figure 2:
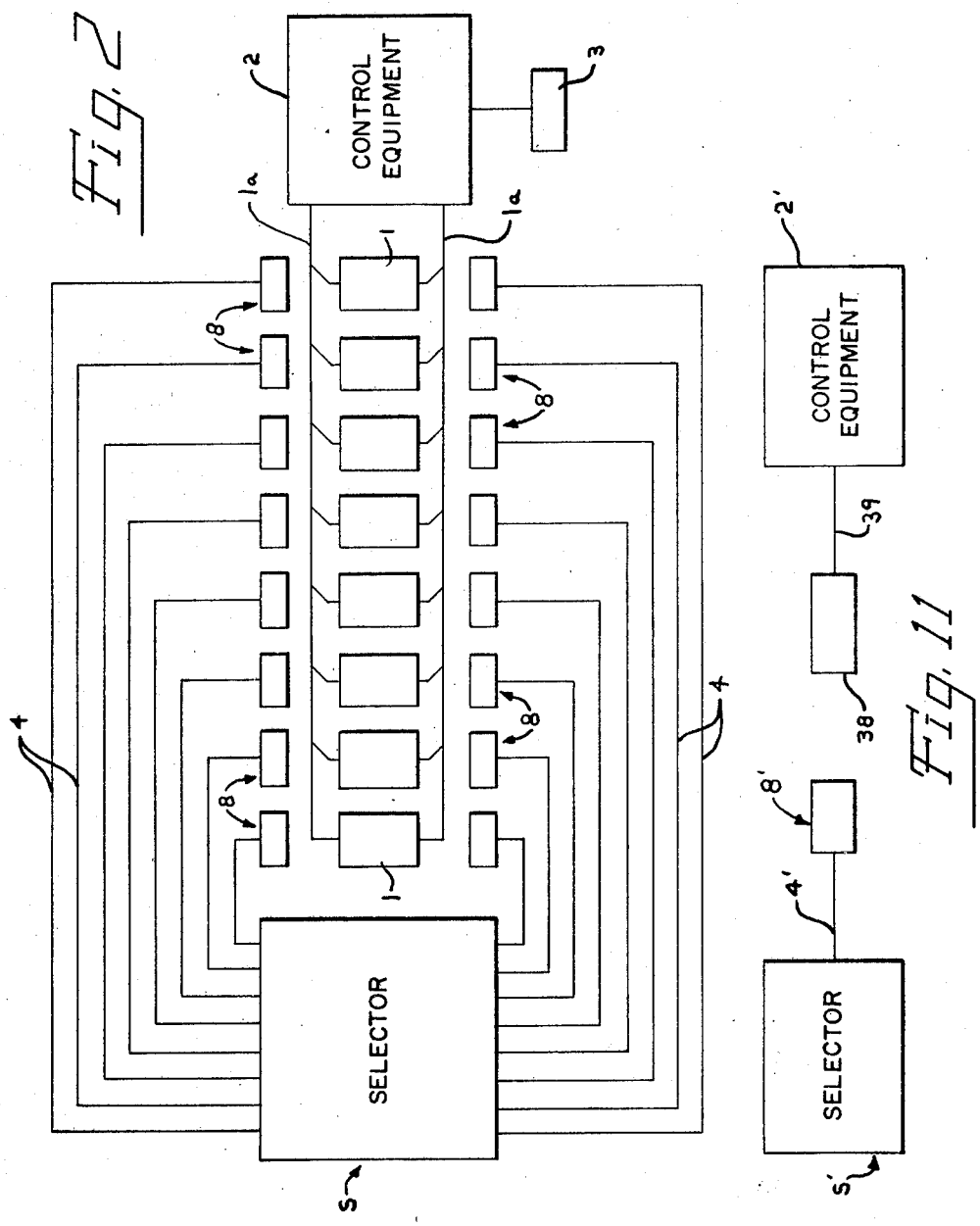
Figure 6:
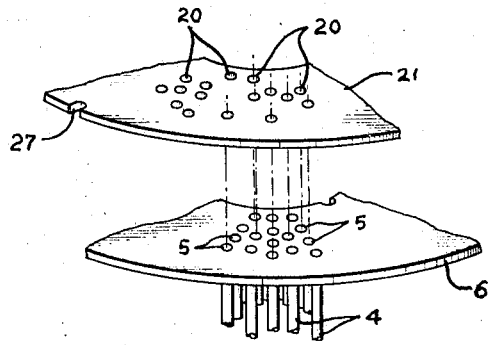
Figure 7:
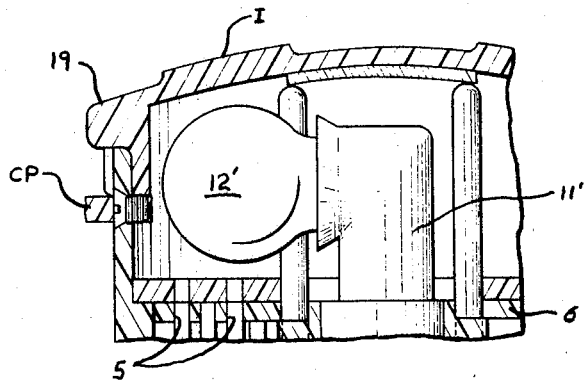
Figure 10:
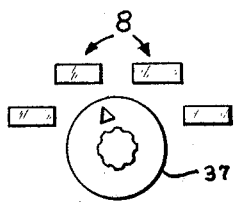

In the drawings:
FIGURE 1 is a perspective view of an optical programmer mounted on equipment to be controlled thereby;
FIGURE 2 is a schematic diagram of the optical programmer;
FIGURE 3 is a plan view of the selector of the optical programmer;
FIGURE 4 is a view taken along lines 4—4 of FIGURE 3;
FIGURE 5 is a perspective view of a light-reflecting member of the selector;
FIGURE 6 is a partial perspective and exploded view of a disc carrying an array of fiber optic means and a code plate movable relative thereto of the selector of FIGURES 3 and 4;
FIGURE 7 is an alternative embodiment of the selector;
FIGURE 8 is a perspective view of a lens member in which one end of the fiber optic means is disposed;
FIGURE 9 is an exploded perspective view of the lens member of FIGURE 8;
FIGURE 10 shows an alternative switch; and
FIGURE 11 is a schematic diagram of an alternative optical programmer.

The present invention will be described in conjunction with an automatic washing machine but is to be understood that the present invention can be used in conjunction with many different types of machines and equipment for which the present invention would be applicable to provide selectable visual programs or to provide selectable programs to automatically operate equipment or the like.

Turning now to the drawings and in particular FIGURES 1 through 6, there is illustrated a conventional automatic washing machine AWM in FIGURE 1. A control panel CP is located on the automatic washing machine and includes a selector S mounted thereon having various indicia I to indicate the various types of washing operations to be performed. Selector S is movable to place a selected washing operation indicated by indicia I opposite pointer P. Double throw single pole switches 1 are mounted in the control panel CP and the switches are connected to a source of supply (not shown) and to conventional control equipment 2 via separate or collecetive lead means 1a within the washing machine to operate the washing machine in accordance with the selected washing operations. A control switch 3 is connected to the control equipment to start the selected washing operation after switches 1 have been moved to their proper positions to operate the control equipment to effect the selected washing operation.

One end of each of fiber optic means 4 is secured in openings 5 in disc 6 which is stationarily mounted on mounting member 7 which in turn is mounted on control panel CP. The other end of each fiber optic means 4 is secured in a lens member 8 disposed adjacent opposing ends of each of switches 1. Mounting member 7 is mounted on control panel CP adjacent an opening 8 in the control panel through which selector S extends for rotary deposition within mounting member 7 as illustrated in FIGURE 4. Mounting member 7 has a hole 9 through which fiber optic means 4 extend and a socket-mounting section 10 in which an electric socket 11 is mounted. An electric bulb 12 is disposed in socket 11 and bulb 12 is located within an area delimited by posts 13 mounted within mounting section 12a adjacent electric socket 11. A piece of asbestos 14 is secured on top of posts 13 to absorb the radiated heat generated by electric bulb 12.

Plates 15 are connected to two of posts 13 and a reflecting member 16 is secured to plate 15. Reflecting member 16 has reflecting surfaces 17 and 18 to reflect the light emanating from bulb 12 in an outward direction by reflecting surface 17 to illuminate the indicia I on indicia-carrying cover 19 and in an inward direction by reflecting surface 18 through coded openings 20 in code disc 21 to the ends of fiber optic means 4 in disc 6 in communication with the coded openings. Reflecting member 16 preferably takes the form of a suitable plastic, however, it can take any other form to provide the dual reflecting surfaces.

Cover 19 includes an annular projection 22 secured to tubular body 23 which is disposed within mounting member 7 and is held therein by means of a spring-biased button 24 engaging an annular groove 25 in tubular body 23 opposite button 24. Arcuate depressions 26 are disposed within annular groove 25 at the positions of occurrence of indicia I so that selector S can be maintained at a selected position by button 24.

Code disc 21 has oppositely disposed recesses 27 (only one being shown in FIGURE 6) in engagement with projections 28 disposed opposite each other on the inner surface of tubular body 23 so as to key code disc 21 and tubular body 23 together to move disc 21 to different positions upon the movement of cover 19, although for polarizing purposes the projections preferably are not diametric.

FIGURE 7 illustrates an alternative embodiment of the lighting arrangement for selector S. In the embodiment of FIGURE 7, electric socket 11' has a right angle configuration in order to position light bulb 12' in alignment with indicia I of indicia-carrying cover 19 and openings 5 of disc 6 thereby eliminating the use of a reflecting member such as used in conjunction with the embodiment of FIGURES 4 and 5.

Openings 5 in which the ends of fiber optic means 4 are secured are arranged in a preselected configuration as a coded array and coded openings 20 in code disc 21 are arranged at each location corresponding to the various operations to be performed in accordance with a code so as to permit openings 20 to be disposed opposite corresponding openings 5 so that selected lens members 8 will indicate a program by the light being transmitted thereto by fiber optic means 4 to indicate to an operator the positions to which switches 1 are to be moved in order to properly program control equipment 2 to perform the selected operation to be performed. After switches 1 have been moved to positions indicated by the illuminated lens members 8, switch 3 is moved to the "on" position and the selected washing operation commences. Code disc 21 therefore has a series of coded openings properly disposed to establish a program transmitting the light emanating from light bulb 12 or 12' to the fiber optic means 4 and then to the various lens members 8. The present invention can be used to translate decimal information into binary information.

Since the light being transmitted by fiber optic means 4 to lens members 8 is a small amount of light because of the small cross-sectional area of fiber optic means 4 and the intensity of the light transmitted through fiber optic means 4 is reduced in proportion to the length of the fiber optic means, it is necessary to use a lens member to provide a readily discernible indication.

Lens member 8 as illustrated in FIGURES 8 and 9 increases the cross-sectional area of the light being transmitted by fiber optic means 4 to a size that is readily discernible for observation. Lens member 8 includes a body 29 having an opening 30 extending therethrough in which the end of fiber optic means 4 is secured by frictional fit, gluing or in any other suitable manner. Side members 31 are glued onto opposing sides of body 29 and each side member includes a lug 32 spaced close to one end of the side member. Lug 32 includes a beveled leading surface 33 and a trailing surface 34 disposed at substantially right angles with respect to the outer surface of side member 31. A cylindrical member 35 having light-transmitting characteristics is disposed against body 29 and between side members 31 and a rectangular member 36 having light-transmitting characteristics is glued to the ends of side members 31 and the ends of member 36 project outwardly from side members 31 about the same distance as lugs 32. Lugs 32 and the projecting ends of member 36 define a holding means to hold lens member 8 within an opening of control panel CP and beveled surfaces 33 facilitate the insertion of lens member 8 within the opening. Body 29 and side members 31 can be made from any suitable plastic material and side members 31 are made from a plastic material so that lugs 32 have resilient characteristics. Surfaces 34 can be also slightly beveled in order to permit lens member 8 to be accommodated in panels of various thicknesses. Body 29 and side members 31 can be made as a unitary structure with one end of the body being provided with a recess in which cylindrical member 35 is disposed and member 36 can be an integral part of the body member or secured to the ends of the side members forming the recess.

The curved surface of cylindrical member 35 is polished and the inside surface of rectangular member 36 is serrated or scored to diffuse the light collected by cylindrical member 35 from fiber optic means 4 to increase the area of received light so that an operator will readily perceive the illuminated lens at wide viewing angles.

FIGURE 10 illustrates a round selector switch 37 which is movable to different lens members as they are illuminated by movement of selector S to the various operating positions. Selector switch 37 can readily replace switches 1.

FIGURE 11 is directed to an alternative embodiment of the optical programmer. FIGURE 11 diagrammatically illustrates selector S' similar to selector S, fiber optic means 4' is connected to respective lens members 8' and disposed opposite each lens member 8' is a conventional photo-electric device 38 which in turn is connected to control equipment 2' via lead means 39. When light appears in lens members 8', the photo-electric devices opposite the illuminated lens members are activated and the activated photo-electric devices operate the control equipment in accordance with the selected program and the machine is operated in accordance with the selected program.

As can be discerned, there has been disclosed a novel and unique optical-programming device to indicate a selected program opposite manually operated switches indicating in which position the switches are to be actuated to operate control equipment which in turn operates a machine in accordance with the selected program. The switches can be eliminated and photo-electric devices disposed opposite light-transmitting means to automatically control the control equipment in accordance with the selected program.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. An optical-programming device comprising fiber optic means having one of their ends disposed in a preselected array and the other of their ends secured adjacent a plurality of equipment-controlling means, a disc having areas provided with selectively-arranged openings to define coded areas, manually controlled means to move said disc relative to said preselected array of fiber optic ends to place any one of said coded areas in alignment with said preselected array, light means disposed adjacent said preselected array to transmit light through said openings in the selected coded area and into the fiber optic means in alignment with these openings with the light received in these fiber optic means being transmitted thereby to the other ends of the fiber optic means to provide operating intelligence for said plurality of equipment-controlling means, means to maintain said means to move said disc at a position corresponding to the selected coded area and means fixedly mounted adjacent to the means to move the disc and cooperating therewith to indicate selection of a coded area.

2. An optical programming device according to claim 1 wherein said light means includes a light source disposed in alignment with said array of fiber optic ends.

3. An optical-programming device for establishing a program comprising light-transmitting means having one of the ends thereof arranged in accordance with a known array and the other of the ends of the light-transmitting means disposed adjacent a plurality of equipment-controlling means, code-disc means having selectable coded areas mounted adjacent said known array, manually controlled operating means connected to said code-disc means to move any of said selectable coded areas opposite said known array, means fixedly mounted relative to the code disc means adjacent thereto cooperating with the operating means to indicate selection of a coded area, light means adjacent said known array to transmit light through said coded areas, into said light-transmitting means and therealong to provide operating intelligence for said plurality of equipment-controlling means, and means being provided to maintain said operating means at a position corresponding to the selected coded area.

4. An optical-programming device according to claim 4 wherein said light-transmitting means comprise fiber optic means.

5. An optical-programming device according to claim 4 wherein the other ends of said light-transmitting means are connected to lens means.

6. An optical-programming device according to claim 4 wherein the equipment-controlling means comprise manually-operated switch means with the other ends of the light-transmitting means disposed adjacent said switch means to indicate positions of operation for said switch means.

7. An optical programming device according to claim 4 wherein the equipment controlling means comprise photoelectric means disposed opposite respective other ends of said light-transmitting means to be actuated by light appearing at these other ends.

8. A selector device comprising a mounting member having a light source disposed therein, light-transmitting means extending outwardly from said mounting member for indicating positions spaced from said mounting-member, means mounting said light-transmitting means adjacent said light source in a predetermined array for receiving light emanating from said light source, code-disc means having spaced coded areas provided with coded openings movably mounted adjacent said mounting means to permit light from said light source to pass through said coded openings onto said light-transmitting means and the light received by said light-transmitting means is transmitted thereby to the indicating positions, manually controlled operating means connected to said code-disc means to move said code-disc means to position the selected coded areas one at a time adjacent to the light-transmitting means, means provided by said operating means to maintain said code-disc means at the selected position, and fixed means adjacent to and cooperating with the operating means to indicate selection of a coded area.

9. An optical-programming device comprising fiber optic means having one of their ends disposed in a preselected array and the other of their ends secured adjacent equipment-controlling means, a disc having areas provided with selectively-arranged openings to define coded areas, means to move said disc relative to said preselected array of fiber optic ends to place any one of said coded areas in alignment with said preselected array, light means disposed adjacent said preselected array to transmit light through said openings in the selected coded area and into the fiber optic means in alignment with these openings with the light received in these fiber optic means being transmitted thereby to the other ends of the fiber optic means to provide operating intelligence for said equipment-controlling means, and means to maintain said means to move said disc at the selected coded area, said light means including a light source disposed adjacent said array of fiber optic ends and reflecting means to reflect light from said light source through said openings in the selected coded area and to reflect light onto indicia on said means to move said disc.

10. A selector device comprising a mounting member having a light source disposed therein, light-transmitting means extending outwardly from said mounting member for indicating positions spaced from said mounting-member, means mounting said light-transmitting means adjacent said light source in a predetermined array for receiving light emanating from said light source, code-disc means having coded areas provided with coded openings movably mounted adjacent said mounting means to permit light from said light source to pass through said coded openings onto said light-transmitting means and the light received by said light-transmitting means is transmitted thereby to the indicating positions, and operating means connected to said code-disc means to move said code-disc means to selected coded area one at a time, and means provided by said operating means to maintain said code-disc means at the selected coded area, light-reflecting means being disposed adjacent said light source to reflect light from said light source in one direction to illuminate indicia on said operating means and in another direction through said coded openings of the selected coded areas.

References Cited

UNITED STATES PATENTS 3,349,406  10/1967  Perry et al.

ARCHIE R. BORCHELT, Primary Examiner

C. M. LEEDOM, Assistant Examiner

U.S. Cl. X.R.

350—96; 340—380

PO-1050
(5/69)

UNITED STATES PATENT OFFICE
CERTIFICATE OF CORRECTION

Patent No. 3,506,836      Dated April 14, 1970

Inventor(s) HERMAN RUEGER

It is certified that error appears in the above-identified patent and that said Letters Patent are hereby corrected as shown below:

Column 5, line 39, "claim 4" should read - - - claim 3 - - - .

Column 5, line 41, "claim 4" should read - - - claim 3 - - - .

Column 5, line 45, "claim 4" should read - - - claim 3 - - - .

Column 5, line 50, "claim 4" should read - - - claim 3 - - - .

SIGNED AND
SEALED
AUG 11 1970

(SEAL)
Attest:

Edward M. Fletcher, Jr.
Attesting Officer

WILLIAM E. SCHUYLER, JR.
Commissioner of Patents